US006381530B1

(12) United States Patent
Vogt (10) Patent No.: US 6,381,530 B1
(45) Date of Patent: Apr. 30, 2002

(54) TRANSFER CASE HAVING TEMPERATURE COMPENSATION

(75) Inventor: Carl Randall Vogt, Raleigh, NC (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/777,431

(22) Filed: Feb. 6, 2001

(51) Int. Cl.[7] .......................................... B60K 17/344
(52) U.S. Cl. ......................................... 701/69; 701/67
(58) Field of Search .............................. 701/69, 67, 82, 701/87; 475/43; 192/35, 53.2; 180/245, 248

(56) References Cited

U.S. PATENT DOCUMENTS

| 5,839,084 A | * | 11/1998 | Takasaki et al. | ............... | 701/69 |
| 6,112,874 A | * | 9/2000 | Koppetal | ..................... | 192/35 |
| 6,292,732 B1 | * | 9/2001 | Steinmetz et al. | ............ | 701/67 |
| 6,315,097 B1 | * | 11/2001 | Burns | .......................... | 192/35 |
| 6,315,099 B1 | * | 11/2001 | Ikeda et al. | ................. | 192/53.2 |

* cited by examiner

Primary Examiner—Richard M. Camby
(74) Attorney, Agent, or Firm—Brinks, Hofer, Gilson & Lione; Greg Dziegielewski (57) ABSTRACT

A transfer case for a four-wheel drive motor vehicle includes an electronic control unit (ECU) and a synchronizer which facilitates shift on the fly operations such as, for example, a shift from two wheel high to four wheel high. A temperature sensor disposed either in the transfer case or elsewhere in the motor vehicle provides a temperature signal to the ECU which is utilized to adjust the on time of the synchronizer to compensate for the viscosity of the lubricating fluid within the transfer case or other temperature related variables which affect the time required to synchronize the drive line components prior to engagement. Such temperature compensation also facilitates fault detection and system oversight since the ECU can accurately anticipate the variability of the operating parameters based upon temperature and determinate malfunctions when operation occurs outside such temperature based parameters.

22 Claims, 5 Drawing Sheets

TRANSFER CASE HAVING TEMPERATURE COMPENSATION

BACKGROUND OF THE INVENTION

The invention relates generally to temperature sensing and compensating devices and, more particularly, to devices for sensing ambient or operating temperature of a motor vehicle transfer case or similar device and adjusting or compensating shifts or operating cycles in response to such sensed temperature.

In motor vehicle driveline components such as transmissions and transfer cases, operation over an extraordinarily wide range of both ambient and operating temperatures is acknowledged to occur. For example, starting and operation of vehicles at temperatures as low as −25° F. (−32° C.) and up to of 120° F. (49° C.) is a routine event of motor vehicle usage. Actual operating temperatures of components such as transmissions and transfer cases varies over an even wider temperature range inasmuch as such low temperatures will be achieved when the vehicle is started but operating temperatures will typically be 100° to 125° F. (55° to 70° C.) above ambient and thus such upper limits may well be 220 to 245° F. (104° to 118° C.) and higher.

Coupled with such known and acknowledged ambient and operating temperature ranges is the temperature related viscosity of virtually all lubricants. The resistance to motion of a lubricating fluid in a shift mechanism at −25° F. (−32° C.), for example, requires significantly greater effort and thus actuator power than at much higher temperatures. Even with a more powerful actuator, a mechanical system operating at such low temperatures will invariably require more time to achieve a given mechanical action relative to the time taken by the same device at an elevated, operating temperature. In order to ensure that a desired action such as a shift from high to low gear or a shift into or out of four wheel drive has safely occurred, the control device may have to assume a worst case scenario: cold weather and allow a completion time which is excessively long in all but the coldest conditions. Such an operating scheme artificially delays shift completion in, for example, warm weather and is undesirable.

The increasing sophistication of transmission and transfer case control systems, the increasing demands of engineering sophistication and consumer sensitivity to noise, vibration and harshness (NVH) has prompted continuing examination of transmission and transfer cases in order to constantly re-evaluate and improve both the mechanical and electronic components and their performance. The present invention is directed to such an improvement.

SUMMARY OF THE INVENTION

A transfer case for a four-wheel drive motor vehicle includes an electronic control unit (ECU) and a synchronizer which facilitates shift on the fly operations such as, for example, a shift from two wheel high to four wheel high. A temperature sensor disposed either in the transfer case or elsewhere in the motor vehicle provides a temperature signal to the ECU which is utilized to adjust the on time of the synchronizer to compensate for the viscosity of the lubricating fluid within the transfer case and other temperature related variables which affect the time required to synchronize the drive line components prior to engagement. Such temperature compensation also facilitates fault detection and system oversight since the ECU can accurately anticipate the variability of the operating parameters based upon temperature and determine malfunctions when operation occurs outside such temperature-adjusted parameters.

It is thus an object of the present invention to provide a motor vehicle transfer case having a temperature compensated controller for a shift synchronizer.

It is a further object of the present invention to provide a motor vehicle transfer case having a temperature compensated controller for a shift mechanism synchronizer.

It is a still further object of the present invention to provide a motor vehicle transfer case having a temperature compensated controller for a shift on the fly synchronizer.

It is a still further object of the present invention to provide a motor vehicle transfer case having an electronic control unit with a temperature input for adjusting the synchronization period of a synchronized clutch to facilitate on the fly shifts.

Further objects and advantages of the present invention will become apparent by reference to the following description of the preferred embodiment and appended drawings wherein like reference numbers refer to the same component, element or feature.

DESCRIPTION OF THE PREFERRED EMBODIMENT

Figure 1:
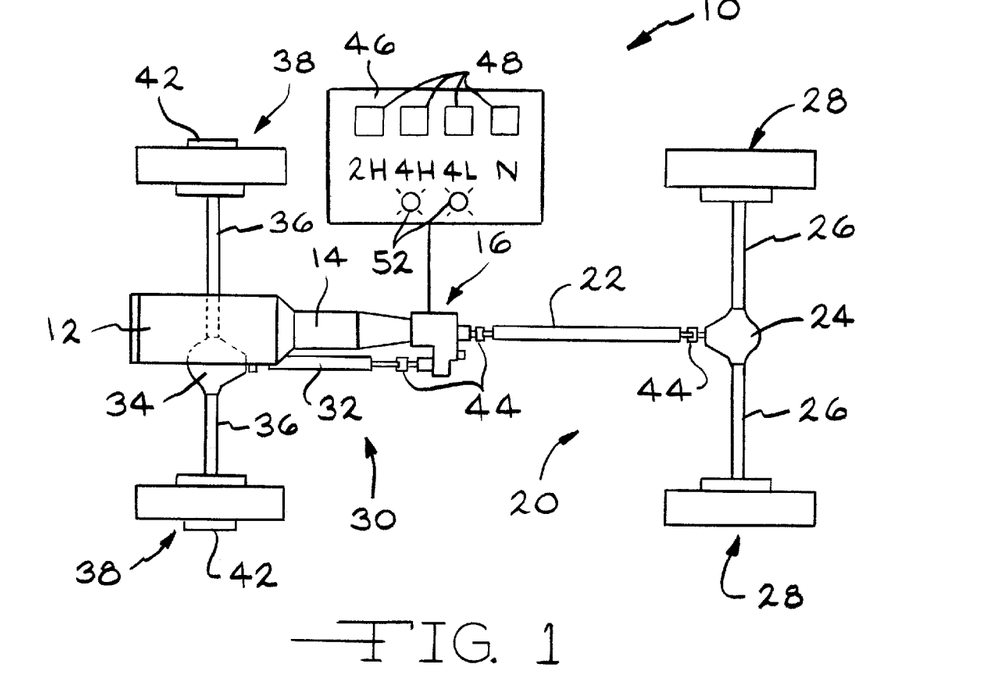
FIG. 1 is a diagrammatic view of a motor vehicle having primary and secondary drivelines and a transfer case incorporating the present invention.

Referring now to FIG. 1, a four-wheel motor vehicle drive train incorporating the present invention is diagrammatically illustrated and designated by the reference number 10. The four-wheel vehicle drive train 10 includes a prime mover 12 such as an internal combustion or Diesel engine which is coupled to and directly drives a transmission 14. The transmission 14 may either be an automatic or manual type. The output of the transmission 14 directly drives a transfer case assembly 16 which provides motive power to a primary or rear driveline assembly 20 comprising a primary or rear prop shaft 22, a primary or rear differential 24, a pair of live primary or rear axles 26 and a respective pair of primary or rear tire and wheel assemblies 28.

The transfer case assembly 16 also selectively provides motive power to a secondary or front driveline assembly 30 comprising a secondary or front prop shaft 32, a secondary or front differential assembly 34, a pair of live secondary or front axles 36 and a respective pair of secondary or front tire and wheel assemblies 38. The front tire and wheel assemblies 38 may be directly coupled to a respective one of the pair of front axles 36 or, if desired, a pair of manually or remotely activateable locking hubs 42 may be operably disposed between the pair of front axles 36 and a respective one of the tire and wheel assemblies 38 to selectively connect same. Finally, both the primary driveline 20 and the secondary driveline 30 may include suitable and appropriately disposed universal joints 44 which function in conventional fashion to allow static and dynamic offsets and misalignments between the various shafts and components. A control console or panel 46 which is preferably located within convenient reach of the vehicle operator includes a switch or a plurality of individual switches or push buttons 48 which facilitate selection of a particular operating mode of the transfer case assembly 16 as will be further described below. If desires two or more indicator lights 52 may be included in the control panel 46 to indicate, for example, four wheel drive modes such as four wheel, high and four wheel, low.

Figure 2:
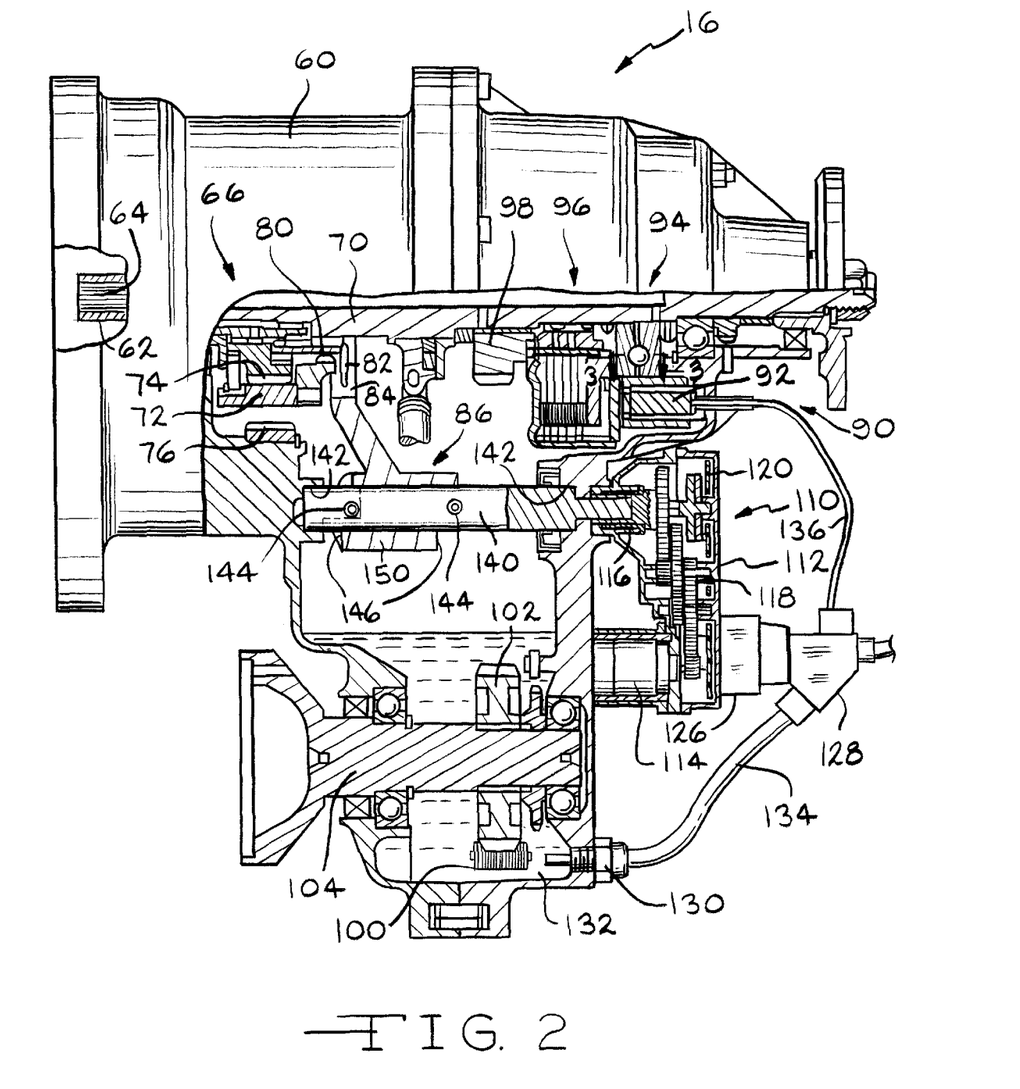
FIG. 2 is a side elevational view with portions broken away of a transfer case incorporating the present invention.
Figure 3:
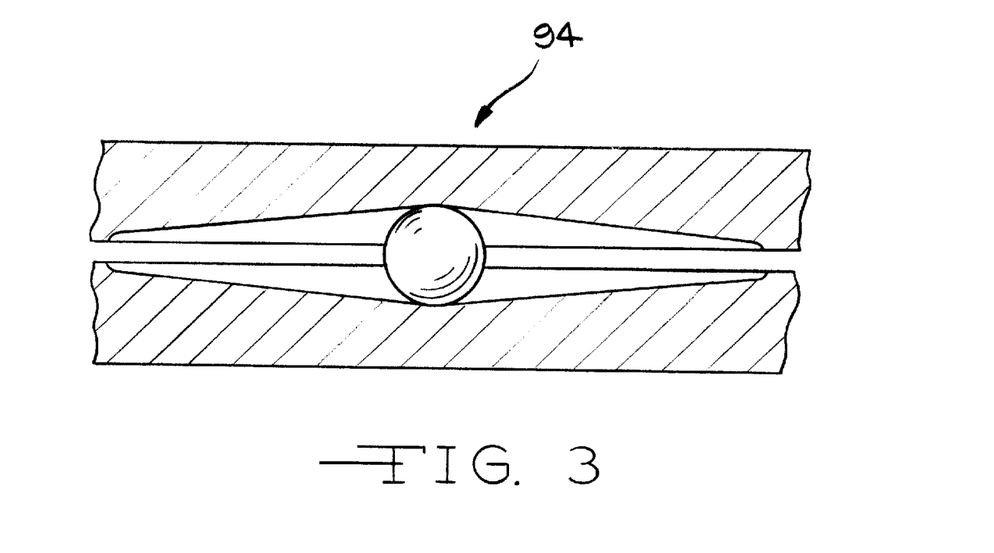
FIG. 3 is a flat pattern development of a portion of a ball ramp clutch operator assembly taken along line 3—3 of FIG. 2.

Referring now to FIGS. 2 and 3, the transfer case assembly 16 includes a multi-piece housing 60 having suitable flanges, openings, shoulders, bearing surfaces and blind apertures which receive, support and secure various elements and components of the transfer case assembly 16. For example, an input shaft 62 which is supported in a suitable ball bearing assembly (not illustrated) includes a splined opening 64 which receives a complementarily splined output shaft (not illustrated) of the transmission 14. The input shaft 62 drives a planetary gear speed reduction assembly 66. By bypassing the planetary gear speed reduction assembly 66 a high gear, direct drive mode is provided to a primary output shaft 70. By engaging the output of the planetary gear speed reduction assembly 66 a low gear, reduced speed output is provided to the primary output shaft 70. A neutral or non-driving mode is also preferably available. Selection of such operating modes is typically made by the vehicle operator through use of the switches 48 of the control console 46 or similar means.

The planetary gear speed reduction assembly 66 includes a planet carrier 72 which receives a plurality of pinion gears (not illustrated) which are in constant mesh with a sun gear 74, driven by and coupled to the input shaft 62, and a ring gear 76. A dog clutch 80 having suitable male or female axial splines is axially translatable from a leftmost position illustrated in FIG. 2 which directly couples the input shaft 62 to the primary output shaft 70, thereby providing high gear or direct drive, through a center, neutral position to a low gear, reduced speed drive in which the dog clutch 80 engages the planet carrier 72 to provide a reduced speed output. A flange 82 or other suitable feature on the dog clutch 80 is engaged by a yoke 84 of a shift fork assembly 86.

The transfer case assembly 16 also includes an electromagnetic clutch assembly 90 having an electromagnetic coil 92, a ball ramp operator assembly 94 and a multiple disc, friction clutch pack assembly 96 which controllably provides drive torque from the primary output shaft 70 to a chain drive sprocket 98 coupled to the output of the friction disc pack assembly 96. The electromagnetic clutch assembly 90 is preferably useful and used as both a synchronizer to bring the speed of the secondary driveline assembly 30 into synchronism with the primary driveline assembly 20 and as a torque transfer device to controllably transfer torque from the primary driveline assembly 20 to the secondary driveline assembly 30. A chain 100 engages both the chain drive sprocket 98 and a driven chain sprocket 102 which in turn is coupled to and drives a secondary output shaft 104. Further details of the electromagnetic clutch assembly 90 and the ball ramp operator assembly 94 are described in U.S Pat. Nos. 4,718,303 and 5,407,024 which are hereby incorporated by reference.

Figure 4:
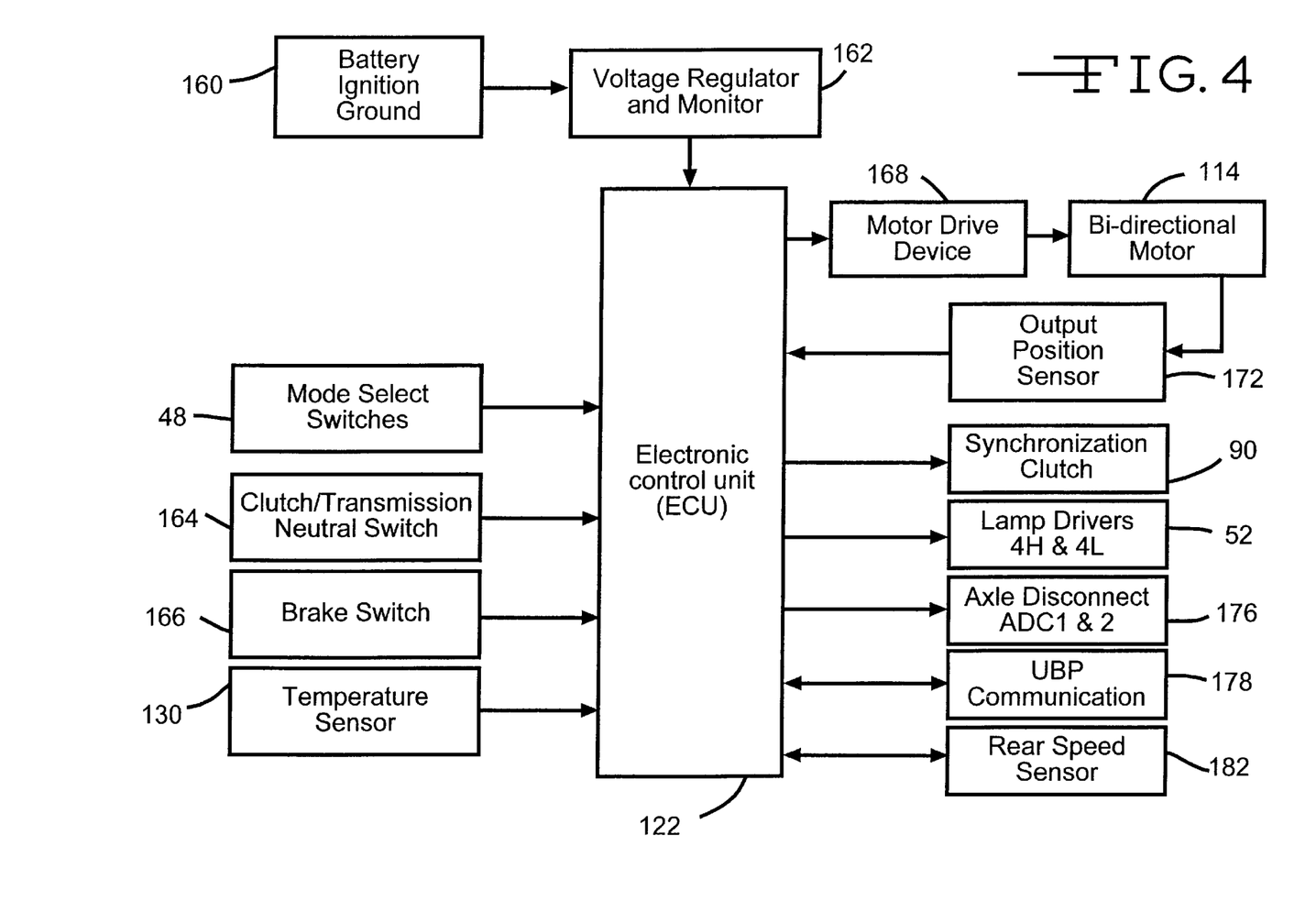
FIG. 4 is a block diagram of the electronic control unit and components of a transfer case incorporating the present invention.

Referring now to FIGS. 2 and 4, the position of the dog clutch 80 and the shift fork assembly 86 is commanded by a shift control assembly 110. The shift control assembly 110 is contained within an auxiliary housing 112. The auxiliary housing 112 includes various openings and bearings which receive components of the shift control assembly 110 and protects such components as well. Secured within the auxiliary housing 112 is an electric drive motor 114 which drives an output shaft 116 through a speed reducing gear train 118. Also contained within the auxiliary housing 112 is a printed circuit board 120 having various components of an electronic control unit (ECU) 122 including a microprocessor 124. A multiple conductor electrical connector 126 is secured to the housing 112 and receives a multiple conductor electrical plug 128 which provides electrical power, signals from data sensors and commands from the switches or push buttons 48 to the electronic control unit 122 and specifically the microprocessor 124. A temperature probe or sensor 130 which is mounted within a suitable threaded opening 132 in the transfer case housing 60 near the bottom of the transfer case assembly 16 in its installed position such that the temperature sensor 130 will be continuously submerged and in contact with lubricant 132 of the transfer case assembly 16. The temperature sensor 130 is preferably a thermistor or similar device providing, for example, a variable resistance and, when excited, a varying voltage signal in response to varying temperature. An electrical cable 134 connects the temperature sensor 130 with the electrical plug 128 and thus provides a signal from the temperature sensor 130 to the electronic control unit 122 and the microprocessor 124 contained on the printed circuit board 120. A cable 136 also connects the electromagnetic coil 132 with the electrical connector 128 and also with the printed circuit board 120 and the electronic control unit 122.

The output shaft 116 of the shift control assembly 110 drives a single shift rail 140 which is received within suitable openings 142 in the transfer case housing assembly 60. The shift rail 140 includes a pair of cam followers 144 which engage opposed parallel cams 146 on the ends of the shift fork body 150 which freely rotatably receives the shift rail 140. As the shift rail 140 rotates, the cam followers 144 engage the cams 146 and, because the shift fork arm 84 is prevented from rotation, the shift fork assembly 86 translates bi-directionally to select the higher direct drive, neutral or lower reduced speed drive outputs of the planetary gear speed reduction assembly 66.

Turning now to FIG. 4, the inputs and outputs of the electronic control unit 122 are illustrated. In accordance with conventional practice, power from the battery and ignition system 160 is provided through a voltage regulator 162 to the electronic control unit 122. Information from various sensors such as the operating mode switches 48, from a transmission or neutral switch 164, a brake switch 166 and the temperature sensor 130 are provided to the electronic control unit 122. The electronic control unit 122 and the microprocessor 124 provide signals to a motor drive device 168 such as a pulse width modulation (PWM) driver which drives the bi-directional electric drive motor 114 and receives signals from an output position sensor 172 which may be disposed on the printed circuit board 120 adjacent the output shaft 116. Such a sensor 172 may be, for example, a multiple Hall effect sensor assembly such as disclosed in U.S. Pat. No. 5,867,092 which is hereby incorporated by reference.

The electronic control unit 122 drives the electromagnetic synchronization clutch 90 as well as the display or indicator lights 52 which may, if desired, be disposed on the control panel 46 or elsewhere in the dashboard of the motor vehicle. The axle disconnects 176 which perform a function similar to the remotely activatable locking hubs 42 may also be driven by the electronic control unit 122. The electronic control unit 122 receives information from the UBP communication system 178 and also receives signals from a rear speed sensor 182 associated with the primary or rear driveline assembly 20 and particularly the primary or rear prop shaft 22.

Figure 5:
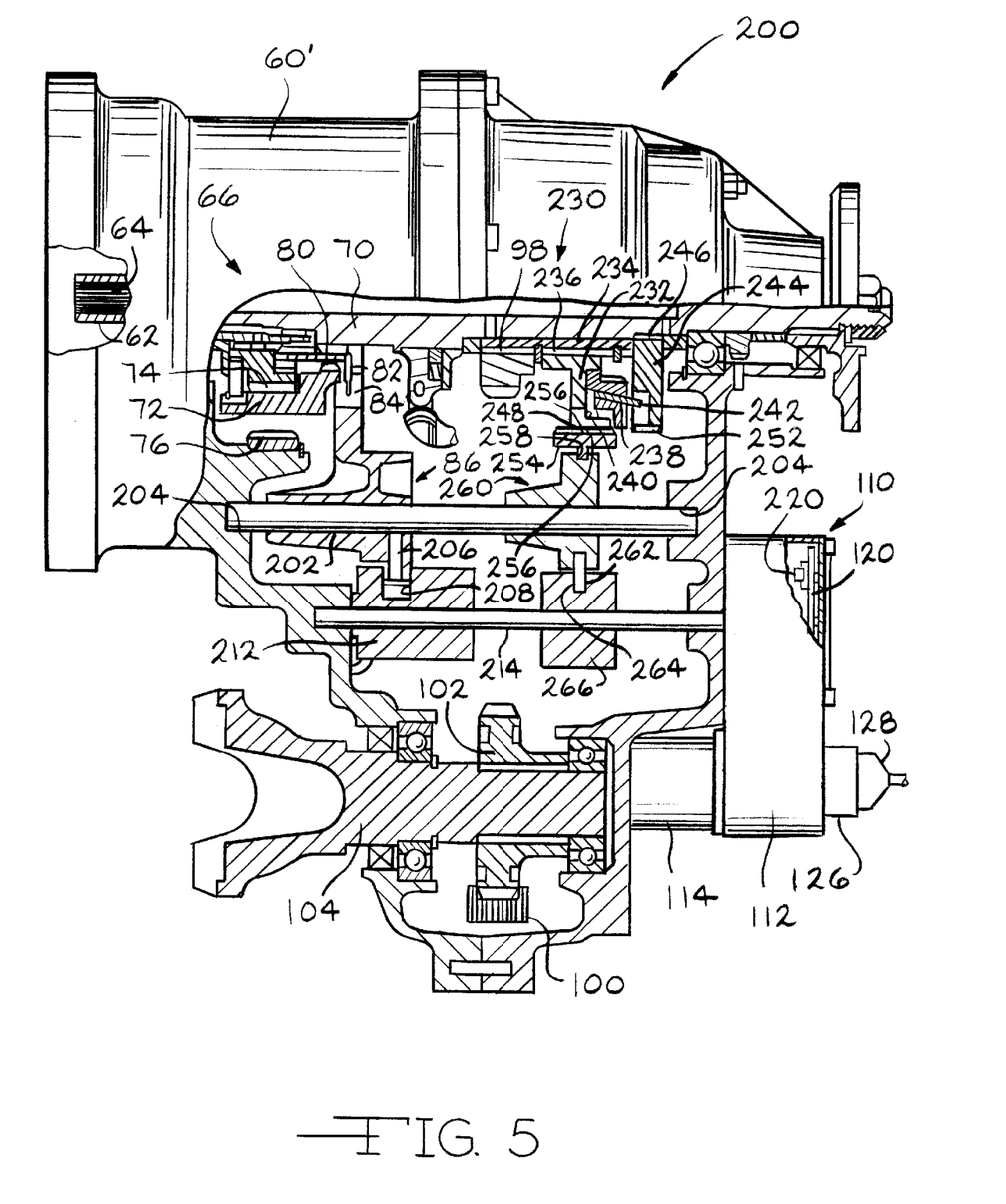
FIG. 5 is a side elevational view with portions broken away of a transfer case incorporating a first alternate embodiment of the present invention.

Referring now to FIG. 5, a first alternate embodiment of a transfer case with temperature compensation is illustrated and designated by the reference number 200. Although designated as the first alternate embodiment transfer case assembly 200, it should be understood from the outset that the first alternate embodiment 200 is of equal utility, applicability and function relative to the preferred embodiment transfer case assembly 16 and it should not be considered to be of lesser utility, applicability or function than the preferred embodiment transfer case assembly 16. In this regard, many mechanical components of the two devices are the same. Accordingly, the following description will briefly note and explain those common components and provide full descriptions of those different or additional components.

The first alternate embodiment transfer case assembly 200 includes a multi-piece housing 60', the input shaft 62 including the splined opening 64 and the planetary gear speed reduction assembly 66 driven by the input shaft 62. By effectively bypassing the planetary gear speed reduction assembly 66, a direct drive mode is provided to the primary output shaft 70. By engaging the output of the planetary gear speed reduction assembly 66, a low gear, reduced speed output is provided to the primary output shaft 70. A neutral or non-driving mode is also preferably provided. Selection of such operating mode is typically made by the vehicle operator through use of the switches 48 on the control panel 46.

The planetary gear speed reduction assembly 66 includes the planet carrier 72 which receives a plurality of pinion gears (not illustrated) which are in constant mesh with the sun gear 74, driven by and coupled to the input shaft 62, and the ring gear 76.

The dog clutch 80 having suitable male or female axial splines is axially translatable from a left most position illustrated in FIG. 5 which directly couples the input shaft 62 to the primary output shaft 70, providing, as noted above, high or direct drive, through a center, neutral position to a low gear, reduced speed drive, also as noted above, in which the dog clutch 80 engages the planet carrier 72. The flange 82 or other suitable feature on the dog clutch 80 is engaged by the yoke 84 of the shift fork assembly 86. The shift fork assembly 86 is freely, slidably received upon a fixed shift rail 202 seated within suitable blind bores 204 formed in the transfer case housing 60'. The shift fork assembly 86 also includes a radially oriented cam follower 206 which is received within a cam track 208 of a cam block 212 which is fixedly secured to a bi-directionally rotating shift control rod 214. The cam track 208 may include regions of dwell to accommodate independent action between it and a commonly controlled clutch.

Rotation of the shift control rod 214 and thus the axial position of the shift fork assembly 86 and the dog clutch 80 is controlled by the shift control assembly 110. The shift control assembly 110, as illustrated in FIG. 2, includes the auxiliary housing 112, the electric drive motor 114, the output shaft 116 and the speed reducing gear train 118. The printed circuit board 120 preferably includes a temperature sensing, variable resistance thermistor 220 which, when excited by a reference voltage, provides a variable electrical signal to the electronic control unit 122. The multiple conductor electrical connector 126 receives a multiple conductor electrical plug 128 which connects the electronic control unit 122 to the various components illustrated in FIG. 4.

Turning again to FIG. 5, the first alternate embodiment temperature compensated transfer case assembly 200 also includes a synchronizer or synchronizing clutch assembly 230. The synchronizer 230 includes a synchronizer collar 232 which is coupled for rotation with a drive sleeve or quill 234 by an assembly of interengaging splines 236. The synchronizer collar 232 receives a plurality of pairs of frusto-conical synchronizer segments 238 which are retained on the synchronizer drive collar 232 by at least one circumferential spring 240. The pairs of synchronizer clutch segments 238 engage opposite faces of an oblique clutch plate 242 having lugs received within a synchronizer hub 244. The synchronizer hub 244 is coupled for rotation with the primary output shaft 70 by an assembly of interengaging splines 246.

The synchronizer collar 232 includes external splines or gear teeth 248 about its periphery and the synchronizer hub 244 likewise includes external splines or gear teeth 252 about its periphery equal in size and number to the gear teeth 248 on the synchronizer collar 232. A clutch collar 254 having internal splines or gear teeth 256 is slidably and continuously engaged with gear teeth 248 on the synchronizer collar 232 and engageable with the gear teeth 252 on the synchronizer hub 244 to positively engage and directly drive the synchronizer clutch collar 232 from the primary output shaft 70 through the synchronizer hub 244. The quill or sleeve 234 is coupled through an interengaging spline set to the chain drive sprocket 98. A flange 258 on the clutch collar 254 is engaged by a second shift fork assembly 260 which is slidably received upon the cylindrical shift rail 202. A cam follower 262 extends radially from the second shift fork assembly 260 and is received within a cam track 264 in a second cam block 266 secured to the shift control rod 214. The cam track 264 may also include regions of dwell to accommodate independent operation of the dog clutch 80. When the shift control rod 214 and the second shift fork assembly 260 translates the clutch collar 254 to the right as viewed in FIG. 5, it engages outer portions of the synchronizer segments 238 and compresses them against the oblique clutch plate 242, commencing synchronization.

In operation, the temperature compensated synchronizers for the transfer case assemblies 16 and 200 provide an appropriate operating time of the synchronizing clutch 90 or 230 relating to the sensed temperature before full engagement thereof or activation of the automatic locking hubs 42 or the axle disconnects 176 in the preferred embodiment transfer case assembly 16 or the locking hubs 42 or axle disconnects 176 and the clutch collar 254 in the first alternate embodiment transfer case assembly 200.

Figure 6:
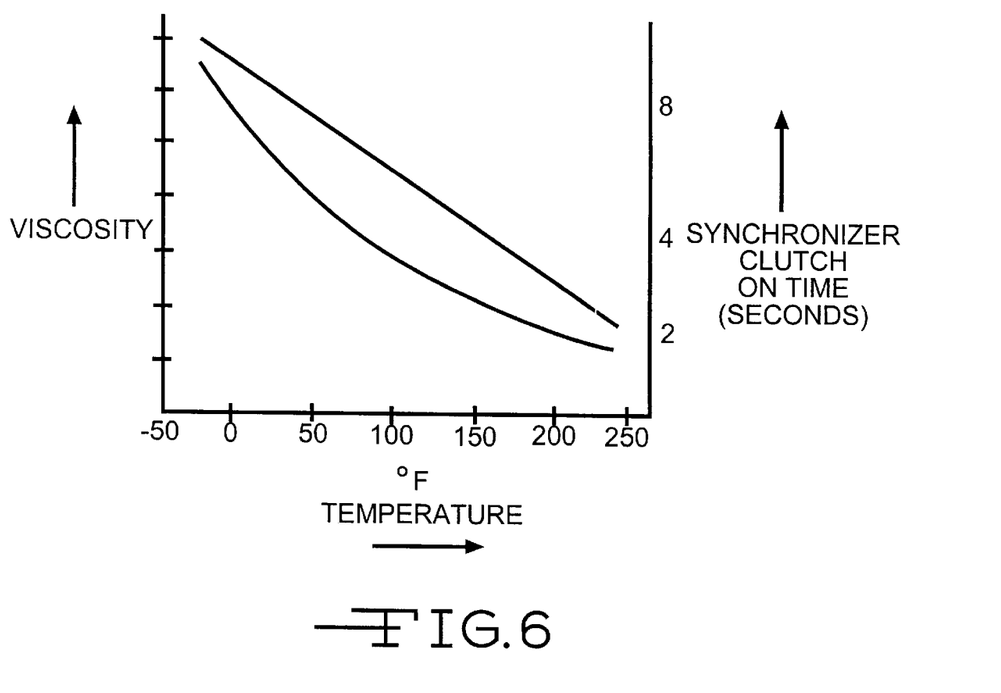
FIG. 6 is a graph presenting qualitative data regarding lubricant oil viscosity, temperature and synchronizer clutch operating time.

FIG. 6 illustrates qualitatively the relationship between lubricant viscosity, temperature and synchronizer operation time. If certain assumptions regarding the viscosity of a lubricant 132 utilized within the transfer case assembly 16 or 200 are made, a relatively straight line relationship may be utilized if two temperature end points and synchronizing times are determined. Alternatively, multiple temperature points may be determined to more closely fit the time to actual viscosity and operation conditions. Such high and low temperature end points or multiple temperature points and their corresponding operating times to synchronization are preferably determined experimentally, that is, by subjecting a specific vehicle and transfer case assembly 16 or 200 to exposure in a cold room at various temperatures to determine the actual time synchronization occurs at various depressed and, preferably, elevated temperatures. The synchronization times as well as an acceptable tolerance or window may be stored in memory in the electronic control unit 122 in a mathematical equation (relationship) between time and temperature or in a lookup table.

Alternatively, and in order to simplify the system and computations by the electronic control unit, the temperature/time relationship can be blocked into ranges wherein temperatures within a certain range provide a specific clutch synchronization time and temperatures in another range provide another, distinct time. This can be achieved by utilizing the signal from the temperature sensor 130 or thermistor 220 to drive two comparators set to switch states at appropriate temperatures and an appropriate logic and timer circuit. The following Table I presents such range related data. The time values presented are for purposes of illustration only. While only three distinct times are presented, it will be appreciated that additional comparators may be utilized to provide four, six or eight distinct states and operating times, if desired.

TABLE I

| Temperature ° F. | Temperature ° C. | Comparator 1 | Comparator 2 | Time (e.g.) |
| --- | --- | --- | --- | --- |
| −68° to 32° | −50° to 0° | 0 | 0 | 8 |
| 32° to 105° | 0° to 40° | 0 | 1 | 4 |
| 105° to 300° | 40° to 150° | 1 | 1 | 2 |

It should be appreciated that the specific combinations of components described with regard to the preferred embodiment transfer case assembly 16 and first alternate embodiment transfer case assembly 200 are not to be construed as limiting but rather as illustrative and exemplary combinations of components. Hence, it should be well understood that, for example, the temperature sensor 130 illustrated in the preferred embodiment may certainly be utilized with the first alternate embodiment transfer case assembly 200 and that, for example, the single shift rail 140 of the preferred embodiment transfer case assembly 16 may also be utilized with the two shift fork assemblies 86 and 260 of the first alternate embodiment transfer case assembly 200. Furthermore, the thermistor 220 of the first alternate embodiment transfer case assembly 200 may be disposed in other locations of the vehicle and, for example, may be utilized generally as an ambient temperature sensor for other features in the vehicle with such information also being supplied to the electronic control unit 122.

The foregoing disclosure is the best mode devised by the inventor for practicing this invention. It is apparent, however, that apparatus incorporating modifications and variations will be obvious to one skilled in the art of temperature sensing and compensating. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

I claim:

1. A transfer case having temperature compensated operation comprising, in combination, a primary output shaft, a secondary output shaft, a synchronizing clutch operably disposed between said input shaft and said output shaft, a temperature sensor for providing a temperature signal, a microprocessor for receiving signals relating to an operating mode of said transfer case and temperature and having an output for controlling said synchronizer clutch, whereby a time period determined by said microprocessor for synchronizing said output shafts increases with decreasing temperature.

2. The transfer case of claim 1 further including a main clutch operably disposed between said input shaft and said output shaft.

3. The transfer case of claim 2 wherein said microprocessor includes means for engaging said main clutch after said synchronizing clutch synchronizes said output shaft.

4. The transfer case of claim 1 wherein said temperature sensor is a thermistor.

5. The transfer case of claim 1 wherein said transfer case includes lubricant and said temperature sensor senses a temperature of said lubricant in said transfer case.

6. The transfer case of claim 1 wherein said synchronizing clutch includes conical clutch segments and an intermediate clutch plate.

7. The transfer case of claim 1 further including a planetary gear speed reduction assembly selectively driving said primary output shaft.

8. The transfer case of claim 1 further including an electric motor controlled by said microprocessor and a mechanical linkage between said motor and said synchronizing clutch.

9. A motor vehicle transfer case having temperature compensation comprising, in combination, a primary output member, a secondary output member, a synchronizer operably disposed between said primary output and said secondary output member, a temperature sensor having an output, and a microprocessor having inputs for receiving shift commands and said output of said temperature sensor and an output driving said synchronizer wherein said synchronizer output actuation time is related to a sensed temperature.

10. The transfer case of claim 9 further including a dog clutch which is engaged after said synchronizer has fully synchronized said output members.

11. The transfer case of claim 9 further including a friction clutch pack which is engaged after said synchronizer substantially achieves synchronization of said output members.

12. The transfer case of claim 9 wherein said temperature sensor is a thermistor.

13. The transfer case of claim 9 wherein said temperature sensor is a thermistor disposed in said transfer case.

14. The transfer case of claim 9 wherein said synchronizer clutch includes a plurality of conical clutch segments and a retaining spring.

15. The transfer case of claim 9 further including a planetary gear speed reduction assembly selectively driving said primary output shaft.

16. The transfer case of claim 9 further including an electric motor controlled by said microprocessor and a mechanical linkage between said motor and said synchronizer.

17. A method of operating a transfer case comprising the steps of:

providing a primary output member, a secondary output member and a synchronizer operably disposed between said output members, providing a signal corresponding to an operator selected operating mode, providing a temperature sensor and sensing a temperature, providing a microprocessor and supplying such operator selected signal and such sensed temperature to said microprocessor, and providing an output signal to energize said synchronizer for a time period which increases as such sensed temperature decreases.

18. The method of claim 17 further including the step of utilizing a mathematical relationship to compute said time period.

19. The method of claim 17 utilizing a look up table to determine said time period.

20. The method of claim 17 wherein said time period is selected from a group consisting of not more than four distinct time periods.

21. The method of claim 17 further including the step of activating a main clutch after substantial synchronism of such members is achieved.

22. The method of claim 17 further including the step of positively coupling such output members after synchronism is achieved.

\* \* \* \* \*